(No Model.) 3 Sheets—Sheet 3.
J. LA DOW.
BALING PRESS.
No. 400,922. Patented Apr. 9, 1889.
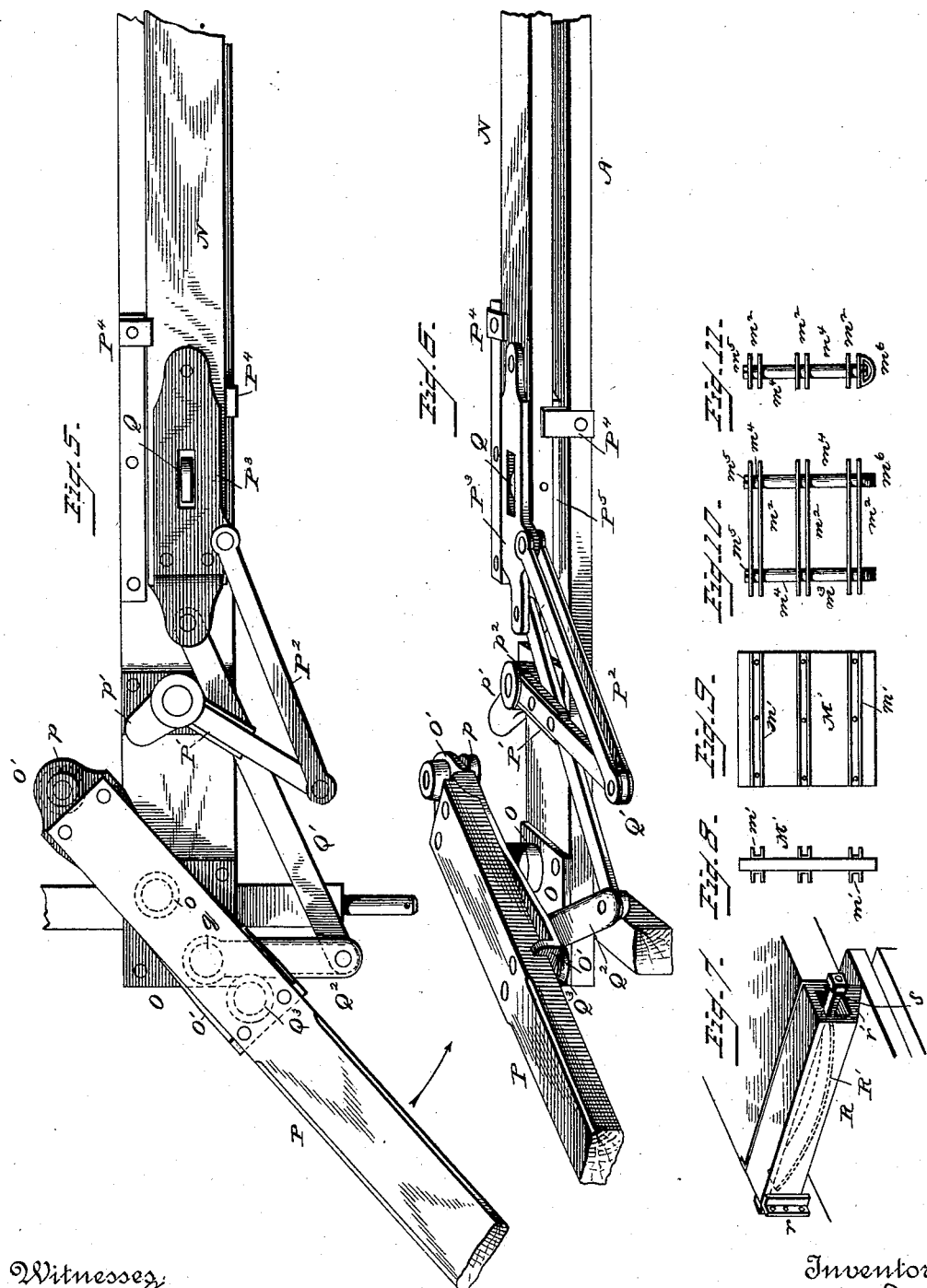
Witnesses:
Inventor
John La Dow,
By his Attorneys,
Baldwin, Davidson & Wight

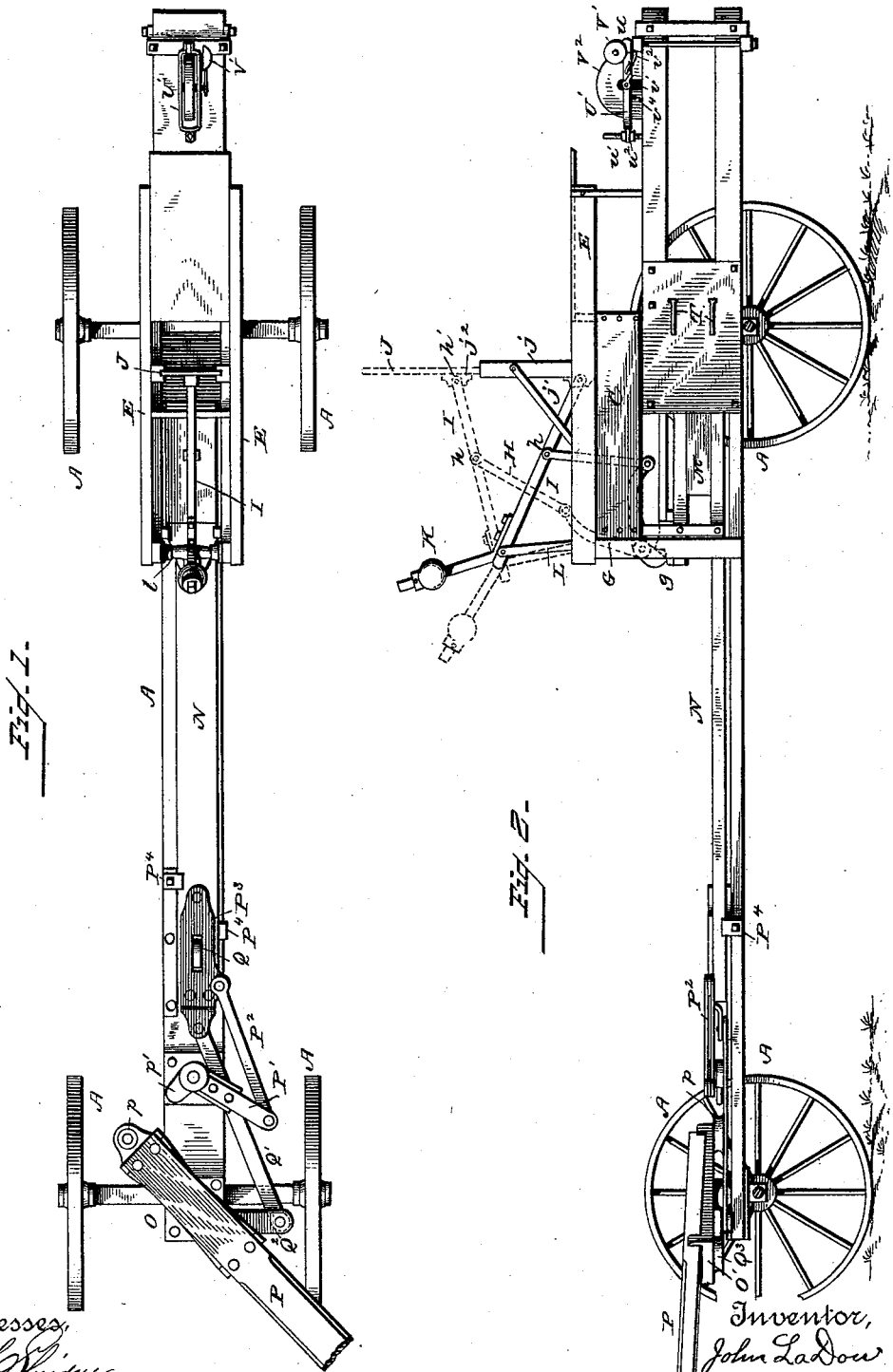

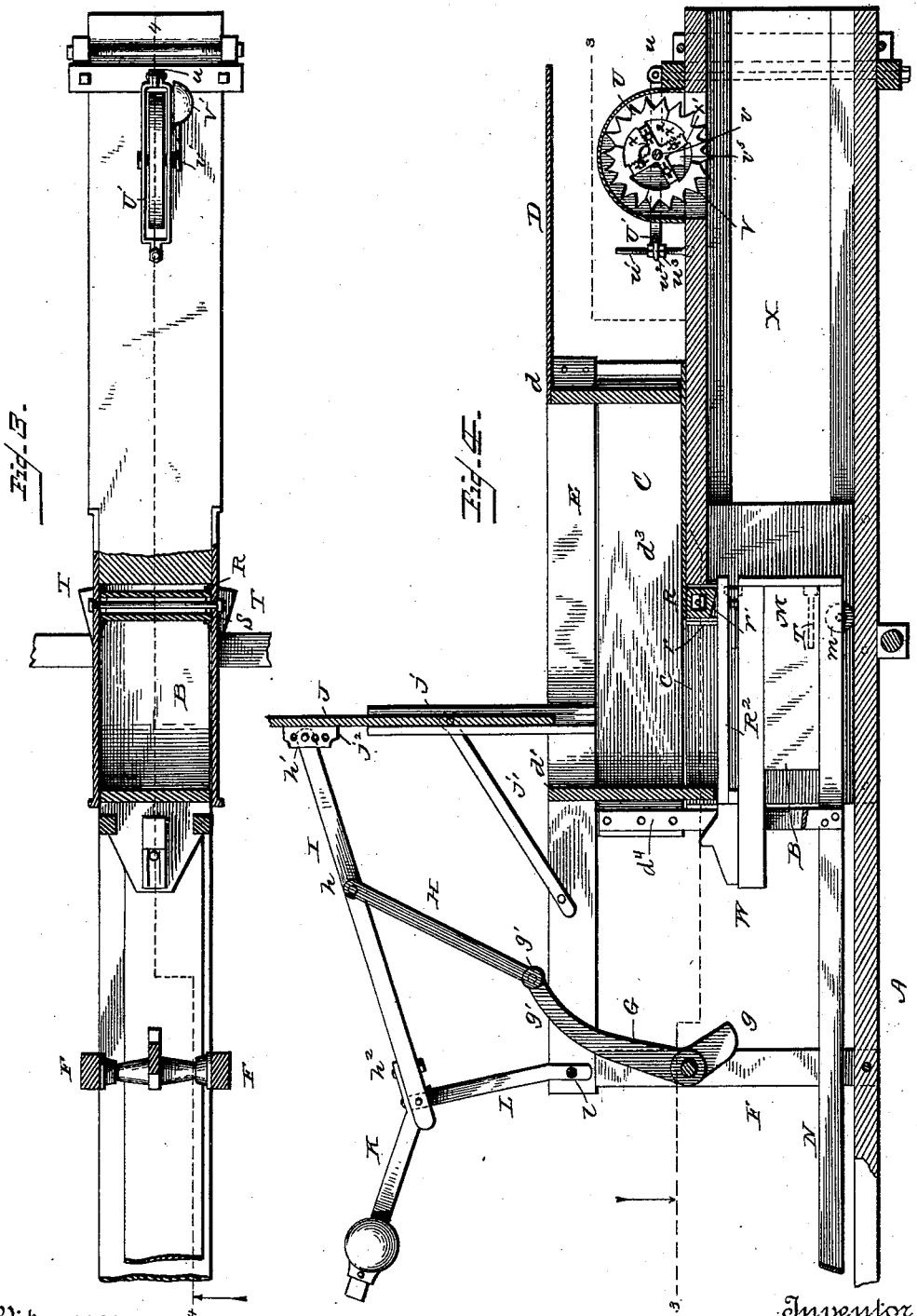

UNITED STATES PATENT OFFICE.

JOHN LA DOW, OF DENVER, COLORADO.

BALING-PRESS.

SPECIFICATION forming part of Letters Patent No. 400,922, dated April 9, 1889.

Application filed September 8, 1888. Serial No. 284,867. (No model.)

*To all whom it may concern:*

Be it known that I, JOHN LA DOW, a citizen of the United States, residing at Denver, in the county of Arapahoe and State of Colorado, have invented certain new and useful Improvements in Baling-Presses, of which the following is a specification.

My improved press is especially designed for baling hay.

The object of my invention is to improve the general construction and operation of the press, whereby it is made to work with great power, speed, and accuracy.

A further object of my invention is to provide improved means for folding the edges of the bales as they leave the compressing-chamber.

My invention consists in providing strong, powerful, and efficient means for operating the plunger or follower which compresses the hay, improved devices for operating the feeder or vertically-reciprocating board which forces the hay from the condenser into the compressing-chamber, improved means for reciprocating the condenser-box, improved means for folding the edge of the bale as it leaves the compressing-chamber, and an improved form of partition-follower.

My invention also consists in certain details of construction and organizations of instrumentalities, hereinafter set forth.

In the accompanying drawings, Figure 1 is a plan view of the press; Fig. 2, a side elevation; Fig. 3, a plan view of one end of the press, showing the interior of the compressing-chamber with certain parts in section, the section being on the line 3 3 of Fig. 4. Fig. 4 is a longitudinal section on the line 4 4 of Fig. 3. Fig. 5 is a plan view, on an enlarged scale, of the lever mechanism for operating the follower. Fig. 6 is a perspective view of the same, showing the parts in a different position. Fig. 7 is a detail view showing the folder. Fig. 8 is a side view of one form of my improved partition-follower. Fig. 9 is a front view of the same. Fig. 10 is a front view of a modified form of follower, and Fig. 11 is a side view of the same.

The press is preferably mounted on a truck, A, which may be of any desired construction. The compressing-chamber B is preferaly located at the rear end of the truck and formed in any suitable way, with closed side and bottom walls.

Over the compressing-chamber B is the condensing-chamber C, into which the hay is fed and prepared for delivery to the compressing chamber, with which it communicates by an opening, $c$. A tail-board, D, is secured to the end piece, $d$, of the walls of the condensing-chamber, and serves to keep the hay from getting down behind the end piece, $d$, as it is moved back and forth. Stationary beams E extend longitudinally along the side walls of the condensing-chamber, and are prolonged beyond said chamber to meet the standards F, to which they are secured.

The end piece, $d'$, of the condensing-chamber is stationary, being secured to the beams E. The sides $d^3$ are movable, said sides being secured to posts $d^4$, which connect with the reciprocating pitman N. As the pitman is reciprocated, the end piece, $d$, and sides $d^3$ are moved back and forth, thus compressing the hay against the end piece, $d'$, ready to be driven through the opening $c$ by the feeder J.

The standards F are secured to the body of the truck A on opposite sides, as shown in Fig. 3, and between them is pivoted a trip-lever, G, having a short downwardly-projecting nose, $g$, and an upwardly-extending arm, $g'$, jointed at $g^2$ to a link, H, which is jointed at $h$ to an arm, I, adjustably secured at $h'$ to the vertically-reciprocating feed-board J. The opposite end of the arm H is secured at $h^2$ to a weighted arm, K, which is in turn secured to an upright arm, L, pivoted at $l$ between the standards F above the trip-lever G. The weighted arm tends to hold the feed-board elevated, as shown in Fig. 4.

The feeder J is mounted in guideways $j$ above the compressing-chamber. The guideways are steadied by braces $j'$. The arm I is connected to the feed-board J by a pin passing through apertures in a block, $j^2$. A series of apertures is employed, so that the point of connection may be varied to regulate the throw of the feeder.

The plunger or follower M is mounted on small wheels $m$, which run along the bottom of the compressing-chamber. A pitman, N, connects the follower with the lever mechanism, by which it is reciprocated.

The lever mechanism is preferably constructed as follows: On the front end of the truck, just over the axle, is secured a casting, O, carrying a stud-journal, $o$, on which is pivoted a casting, O', secured to the main operating-arm or "sweep" P. On the under side of the outer end of the casting O' is mounted a roller, $p$, which bears at times against the nose $p'$ of the bell-crank lever P' and against the arm $Q^2$, as will be explained farther on. The lever P' is pivoted on a plate, $p^2$, secured to the truck, and its longer arm is jointed to a link, $P^2$, preferably made in two parts, as shown, and secured to a plate, $P^3$, on the upper side of the end of the pitman N. The pitman N at its front end passes between guides $P^4$ on opposite sides of the truck, to keep it in proper position when at work.

A friction-wheel, Q, mounted in the plate $P^3$ and extending through the pitman, bears upon the truck-body. A plate, $P^5$, similar to the plate $P^3$, is secured to the under side of the pitman. The extreme outer end of each of the plates $P^3$ and $P^5$ is jointed to a link, Q', which is in turn jointed to an arm, $Q^2$, pivoted at $q$ to the casting O in front and preferably to one side of the journal of the sweep P. A roller, $Q^3$, on the under side of the casting O', bears against the side of the arm $Q^2$. When the sweep is moved forward in the direction indicated by the arrow, the roller $Q^3$ moves the arm $Q^2$ inward toward the baling-chamber and forces forward the pitman N, carrying the follower M. As the sweep continues its movement, the roller $Q^3$ rides off of the arm $Q^2$ and engages with the nose $p'$, forcing the longer arm backward, and, by means of the link $P^2$, withdraws the pitman and follower to their original position. The roller $p$ on the end of the sweep performs the same function as the roller $Q^3$, acting on the arm $Q^2$ and bell-crank lever P' to reciprocate the pitman and follower. By this organization the pitman and follower are reciprocated continuously and with great power, and the several parts are arranged to move with as little friction as possible.

A large pulley may be substituted for the sweep, enabling the press to be run by steam-power. It is obvious that the bell-crank lever P' and link $P^2$ may be omitted, and the follower will then rebound by the recoil of the hay.

The follower M may be of any suitable construction.

The partition-followers, or the followers which are placed between the bales, are preferably constructed as shown in Figs. 8 to 11, inclusive, of the drawings. In Figs. 8 and 9 the follower is shown as consisting of a plate, M', having arranged on opposite sides channeled bars $m'$, extending horizontally from one side of the plate to the other. I have shown three of these bars on each side of the plate arranged one above the other at suitable distances apart, to form grooves in the bale for the baling-wires. When the bales are thus grooved, less wire is required in baling, and the wires are not so apt to slip from their position on the bale. The channeled irons may be secured to the plate M' in any suitable way. In Figs. 10 and 11 I have shown another form of partition-follower. In this instance I place three pairs of flat bars, $m^2$, on rods $m^3$. Spacing-thimbles $m^4$ are arranged between the two bars of a pair and between each pair of bars to hold them a suitable distance apart. Clamping-nuts $m^5$ are applied to the upper ends of the rods $m^3$, and the lower ends terminate in curved feet $m^6$, which slide on the bottom of the compressing-chamber. The bars project from both sides of the rods $m^3$. In both instances the followers present ribs adapted to enter the bales and form grooves for the baling-wires.

Just over the front end of the compressing-chamber is arranged the folder R. (Clearly shown in Figs. 3, 4, and 7.) The folder is preferably made of metal, and is closed on all sides, except at its ends. It is made hollow to accommodate a bolt, S, which extends through it, and is secured to the side framing, as shown in Fig. 3. A spring, R', is arranged within the folder, and tends to depress it. The spring is preferably made curved, as shown, the outer ends bearing against the bolt S and the lower middle part bearing against the lower inner surface of the folder. The spring being thus incased acts freely, dust, hay, seeds, &c., being excluded from it. The folder moves vertically in guides $r$ on the frame, and on its lower side is beveled or inclined at $r'$ from its front edge backwardly. The lower edge of the folder normally bears on a beam, $R^2$, secured to the top of the follower. When the follower is withdrawn from the compressing-chamber, the folder is forced down by the spring R', and, acting on the rear end of the compressed hay, neatly folds it on its upper edge. When the follower returns, the folder is forced up by the beam $R^2$, working against the inclined under side, $r'$.

Retainers T are arranged in the sides of the compressing-chamber, allowing the compressed hay to move through the chamber, but preventing its return. These retainers are of well-known construction, and need no further description.

Near the rear end of the baling-chamber is arranged a device for indicating the number of bales fed through the press. As shown in the drawings, it consists of a toothed wheel, U, journaled in arms U', pivoted at one end to the top of the frame at $u$. At their opposite ends the arms are connected to an upright screw-threaded bar, $u'$, by means of a sleeve-nut, $u^2$, and an eyebolt, $u^3$. By turning the nut the outer end of the arms may be elevated or depressed, thus elevating or depressing the wheel U. The wheel U extends through a slot, V, in the top of the baling-chamber, and its teeth engage with the compressed baled hay as it passes through. The axle $v$ of the wheel U turns with the wheel and carries an arm, $v'$, which at each revolution strikes the end of a lever, $v^2$, pivoted to one of the arms U', and turns it on its pivot. The opposite end of the lever $v^2$ is connected to the hammer mechanism of a gong or bell, V', so that as the lever $v^2$ is turned by the arm $v'$ the gong is sounded. The wheel is of such a size and the teeth are so arranged as to correspond with the length of a bale. One bale passing through the baling-chamber turns the wheel and sounds the alarm once. The size of the wheel may be adjusted by forming it in sections, as shown, and forming each spoke in two parts, the inner parts, $x$, being stationary relatively to the axle and being connected to the outer parts, $x'$, by set-screws working through slots $x^2$. The spoke-sections may be provided with teeth, as shown, to insure a firm connection between them. The movement of the wheel is regulated, not only by the size of the wheel as adjusted by the sections, but also by its vertical position as regulated by the adjustable arms U'. The wheel is preferably inclosed in a casing, V$^2$, secured to the top of the baling-chamber by hooks $v^4$. The casing is slotted at $v^5$, as shown, to fit over the axle of the wheel U.

The feed-board J is operated as follows: A block, W, on the upper rear end of the follower M, engages at each reciprocation of the pitman with the nose $g$ of the lever G. When the block is moved backward, it forces the nose $g$ back and thus forces the arm $g'$ down. This pulls down the arm I and causes the feed-board to descend into the compressing-chamber and force the accumulated hay through the opening $c$ into the compressing-chamber B in front of the follower. In its backward movement the block passes by the nose $g$, and on its return again engages with it and returns the several parts to their original position.

The component parts of the entire apparatus are so arranged and adjusted as to do their work at the proper time and in a suitable manner to do the work effectively.

The hay, being fed into the chamber C, is condensed by the board $d$ as it is moved toward the board $d'$ by the backward movement of the pitman N. The block W on the follower reaches the lever G, and passing backward operates the lever G to force down the feed-board J and feed the condensed hay into the compressing-chamber in advance of the follower. On the return of the follower, the hay is carried through the compressing-chamber past the folder R, which operates as above explained. The bale then passes through the baling-chamber X, operating the alarm mechanism to indicate the proper time to tie bales, also the number of bales passing out.

The organization shown and the details of construction are all simple and efficient; but various changes may be made without departing from my invention.

I claim as my invention—

1. The combination, substantially as hereinbefore set forth, of the follower, the pitman secured thereto, the sweep, the jointed arms Q' Q$^2$, pivotally connected therewith and forced inward by the sweep to push the pitman forward, the link P$^2$, pivoted to the pitman, the bell-crank lever P', jointed to the link and with which the sweep engages to return the pitman, and the rollers Q$^3$ and $p$ on the sweep.

2. The combination, substantially as hereinbefore set forth, of the follower, the pitman secured thereto, the sweep, the casting on which it is mounted, the jointed levers for forcing the pitman forward, the bell-crank, jointed levers for returning the pitman, and the rollers on the under side of the sweep at its inner end operating upon said levers.

3. The combination, substantially as hereinbefore set forth, of the compressing-chamber, the reciprocating follower, the condensing-chamber, the vertically-reciprocating feed-board, the trip-lever having a projecting end or nose, $g$, at its lower end, connections between the trip-lever and the feed-board, and the block W, having an inclined upper surface mounted on the rear end of the follower, which engages with the trip-lever.

4. The combination, substantially as hereinbefore set forth, of the side casing of the compressing-chamber, the hollow folder, the bolt extending through the folder and secured to the casing, and the spring incased within the folder and bearing against the bolt and the folder.

5. The combination, substantially as hereinbefore set forth, of the main frame, the compressing-chamber, the reciprocating follower, the folder having a lower beveled side, the guideways at the ends in which it moves vertically, the spring attached to the frame for forcing the folder down, and the beam secured to the top of the plunger against which the lower beveled side of the folder bears.

6. The combination, substantially as hereinbefore set forth, of the compressing-chamber and a partition-follower consisting of the combination of the flat rods, the bars on which they are mounted, the spacing-thimbles, and devices for securing the rods and thimbles on the bars.

7. The combination, substantially as hereinbefore set forth, of the baling-chamber, the compressing-chamber, the plunger which reciprocates within the compressing-chamber, the condensing-chamber located above the compressing-chamber, the folder below the condensing-chamber and above the compressing-chamber, the pitman-arm connected to the plunger, the vertically-reciprocating feed-board, the guideways in which it moves, the uprights F, secured to the main frame, the jointed levers L and I, flexibly connected to the uprights F and the upper end of the feed-board, a weighted arm, K, secured to said levers, the pivoted bell-crank trip-lever G, pivoted to the uprights F, the hinged arm H, connecting the upper end of the lever G with the arm I, and the block W, carried by the plunger, with which the lower end or nose, $g$, of the bell-crank lever G engages.

In testimony whereof I have hereunto subscribed my name.

JOHN LA DOW.

Witnesses:
 EDW. BAILEY,
 GEO. G. HALL.